United States Patent
Iaboni

[19]
[11] Patent Number: 6,098,720
[45] Date of Patent: Aug. 8, 2000

[54] AGRICULTURAL IMPLEMENT PROVIDED WITH A SCRAPER AND A BLADE

[76] Inventor: Biagio Iaboni, 38 Southern Pkwy., Plainview, N.Y. 11803

[21] Appl. No.: 09/237,708

[22] Filed: Jan. 26, 1999

[51] Int. Cl.[7] ................................................ A01B 1/00
[52] U.S. Cl. ............................................................. 172/378
[58] Field of Search ............................ 37/371, 375, 378; 294/51

[56] References Cited

U.S. PATENT DOCUMENTS

| | | | |
|---|---|---|---|
| 1,528,843 | 3/1925 | Olesen | 172/378 X |
| 1,665,183 | 4/1928 | Urban | 172/378 X |
| 1,808,293 | 6/1931 | Coppock | 172/378 |
| 2,296,916 | 9/1942 | Gamburg | 172/378 X |
| 3,402,543 | 9/1968 | Staggers | 172/375 X |
| 3,797,581 | 3/1974 | Holloway | 172/375 X |
| 5,411,101 | 5/1995 | Bonavitacola | 172/378 |

*Primary Examiner*—Robert E. Pezzuto
*Attorney, Agent, or Firm*—Bucknam and Archer

[57] ABSTRACT

An agricultural implement provided with a scraper, a blade and a handle. The handle is attached to the center of the scraper. The tines of the scraper are curved at an angle of about 90 degrees. The blade is attached to the end tine. The blade is provided with a sharp end portion.

1 Claim, 1 Drawing Sheet

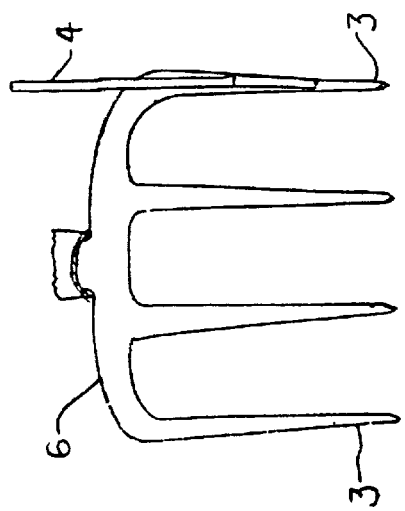
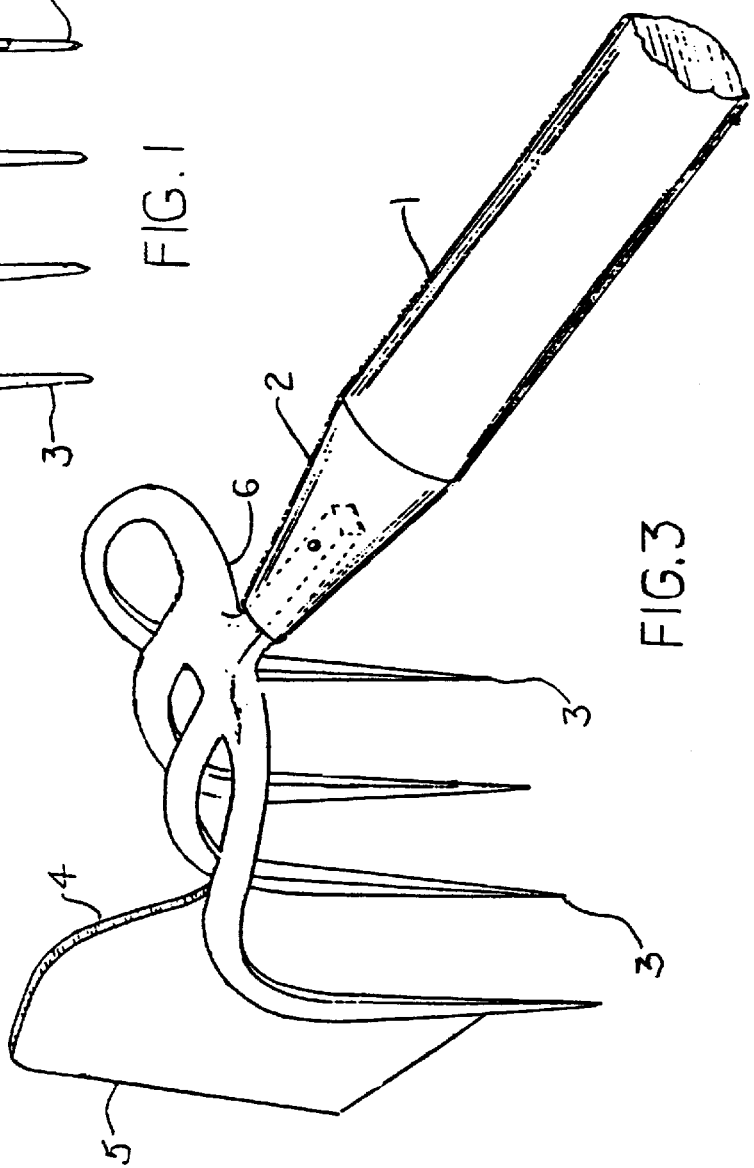
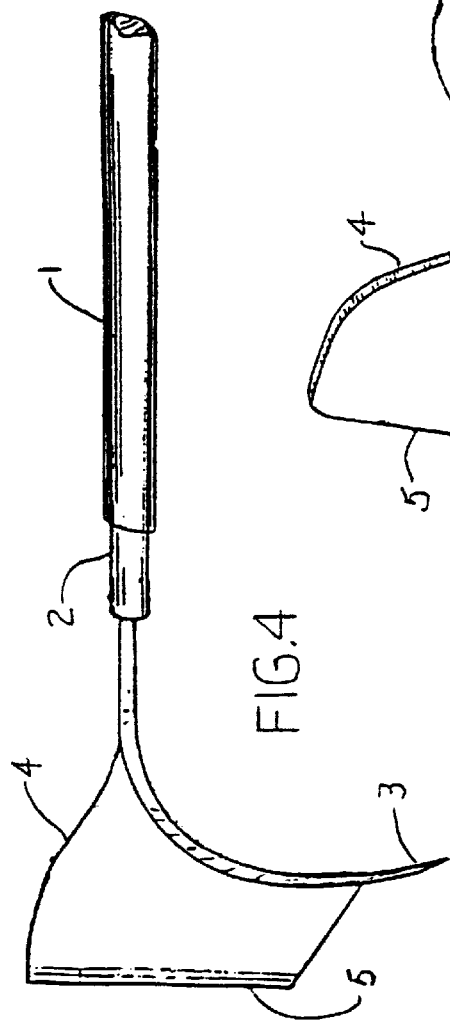
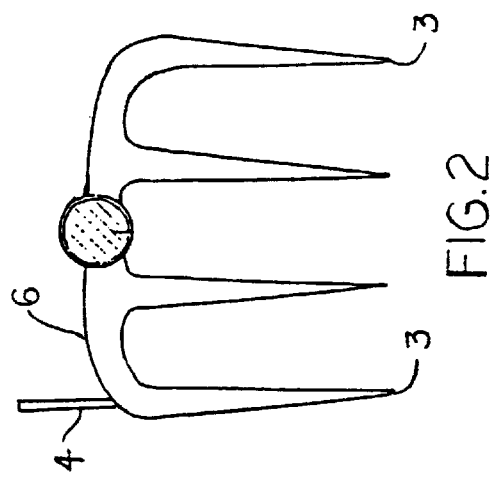

AGRICULTURAL IMPLEMENT PROVIDED WITH A SCRAPER AND A BLADE

FIELD OF THE INVENTION

The present invention relates to an improved agricultural implement provided with a scraper and a blade.

BACKGROUND OF THE PRIOR ART

Many agricultural tools are known provided with a rake and blade. For instance, Design Pat. No. 193,486 describes a tool consisting of a handle, attached to the center of a rake, the rake being provided with two blades.

In U.S. Pat. No. 2,726,504 which issued in 1955, the rake has blades extending from the ends of a rake.

In U.S. Pat. No. 1,223,722 which issued in 1917, the handle is attached to a bifurcated sleeve. A lever, a semicircular plate, a blade having tines are provided. It is there stated that when the device is adjusted with the blade extending downwardly, the lever engages a recess formed in the semicircular plate and the blade could be used as a scraper or a shovel. This construction is rather complex because it involves the use of a lever, a semicircular plate and a sleeve.

SUMMARY OF THE INVENTION

An object of the invention is to provide a simple tool which performs the functions of a scraper and a blade and which is manufactured very inexpensively. The teeth of the scraper loosen and soften the soil, remove weeds and provide a more fertile soil for flowers and plants to grow. The tool performs the function of a hoe because it includes a flat blade. The blade which is attached to the scraper is mounted in a way that makes cultivation with the scraper capable to go between the shrubs, bushes and flowers. The blade is mounted on the end tine so that it is almost invisible to the user. The advantage of this invention is that the blade is very important for the cultivation process because it enables one to edge the beds separating the grass line from the soil line. The blade resets the soil on the roots of the plants after the rain or sprinkling event. The blade also acts as a shovel. The tool of this invention is very useful to the landscapers because it enables them to perform both jobs with only one tool. Essentially the device includes a handle, connected to a head having at least four tines which are curved to an angle of about 90 degrees. A plate which functions as a blade is attached to the end tine. The device is simply manufactured from steel or iron and requires no lever.

BRIEF DESCRIPTION OF THE DRAWINGS

The advantages and the simplicity of the device will be better understood by reference to the accompanying drawings which are submitted by way of illustration and are not intended to be limiting of which:

FIG. 1 is a front elevational view of the device of the invention;

FIG. 2 is a rear elevational view of the device of FIG. 1;

FIG. 3 is a perspective view;

FIG. 4 is the left side view partially in perspective. The right side is the same but in the opposite direction.

By reference to the drawings, numeral 1 is the handle and the sleeve, preferably made of steel, which connects the handle to the scraper, is designated by numeral 2. Numeral 6 is the head of the scraper and the tines of the scraper are designated by numeral 3. The blade is designated by numeral 4. The blade has a sharp end portion designated by numeral 5 and acts as a shovel.

The handle is attached to the center of the scraper.

What is claimed is:

1. An agricultural implement for use in cultivating flower and plant beds and edging such beds, said agricultural implement comprising:

a) a longitudinally extending handle;

b) a scraper having a head portion and at least four tines extending in a curve from said head portion to an angle of about 90 degrees, said scraper being connected to said handle by a sleeve arranged centrally on said head portion so that said tines are substantially orthogonal to said handle; and c) a blade integral with an end tine of said scraper extending longitudinally therefrom and having a sharp end portion, said blade having a curved bottom so as to form a shovel.

* * * * *